United States Patent
Widiger et al.

(10) Patent No.: US 11,176,308 B1
(45) Date of Patent: Nov. 16, 2021

(54) EXTRACTING PARASITIC CAPACITANCE FROM CIRCUIT DESIGNS

(71) Applicant: International Business Machines Corporation, Armonk, NY (US)

(72) Inventors: David J. Widiger, Pflugerville, TX (US); Steven Joseph Kurtz, Austin, TX (US); Susan Elizabeth Cellier, Hopewell Junction, NY (US); Lewis William Dewey, III, Wappingers Falls, NY (US); Ronald Dennis Rose, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/906,874

(22) Filed: Jun. 19, 2020

(51) Int. Cl.
*G06F 30/398* (2020.01)
*G06F 119/02* (2020.01)
(Continued)

(52) U.S. Cl.
CPC ............ *G06F 30/398* (2020.01); *G06F 30/39* (2020.01); *G06F 2119/02* (2020.01); *G06F 2119/12* (2020.01); *G06F 2119/18* (2020.01)

(58) Field of Classification Search
CPC .... G06F 30/398; G06F 30/39; G06F 2111/06; G06F 2119/10; G06F 2111/20;
(Continued)

(56) References Cited

U.S. PATENT DOCUMENTS 6,061,508 A    5/2000   Mehrotra et al.
6,068,660 A *   5/2000   Lu .......................... G06F 30/367
                                                                                                          703/2
(Continued)

OTHER PUBLICATIONS

Nouet et al.; "A test chip for interconnect capacitance modelling in a CMOS process"; Proceedings of International Conference on Microelectronic Test Structures; Conference Paper | Publisher: IEEE (Year: 1996).*

(Continued)

*Primary Examiner* — Helen Rossoshek
(74) *Attorney, Agent, or Firm* — Erik Johnson; Otterstedt, Wallace & Kammer, LLP

(57) ABSTRACT

An integrated circuit includes a target wiring layer, a first adjacent wiring layer above the target wiring layer, and a second adjacent wiring layer below the target wiring layer. Each adjacent wiring layer including crossing wires orthogonal to the target wiring layer. Modify a putative design of the integrated circuit by selecting a target wire; identifying lateral neighbors of the target wire; defining regions of the target wire where the lateral neighbors are homogeneous in cross-section; for each region of the target wire, calculating a wire pattern for the crossing wires; identifying segments within above and below portions of the wire pattern; for each above and below segment pair, obtaining a per-unit-length capacitance from a reduced pattern database; extracting a total parasitic capacitance from the per-unit-length pattern capacitances; and in response to an assessment of the impact of the total parasitic capacitance on circuit performance, producing a modified design.

20 Claims, 13 Drawing Sheets

(51) Int. Cl.
*G06F 119/12* (2020.01)
*G06F 119/18* (2020.01)
*G06F 30/39* (2020.01)

(58) Field of Classification Search
CPC ............ G06F 2119/02; G06F 2119/12; G06F 2119/18; G06F 30/00; G06F 30/337
See application file for complete search history.

(56) References Cited

U.S. PATENT DOCUMENTS

| | | | | |
|---|---|---|---|---|
| 6,175,947 B1 * | 1/2001 | Ponnapalli | ............ | G06F 30/367 716/115 |
| 6,185,722 B1 | 2/2001 | Darden et al. | | |
| 6,477,686 B1 | 11/2002 | Dewey, III et al. | | |
| 6,574,782 B1 | 6/2003 | Dewey, III et al. | | |
| 6,832,360 B2 * | 12/2004 | Li | ............ | G06F 30/398 716/112 |
| 6,835,647 B2 * | 12/2004 | Amishiro | ............ | H01L 23/5222 257/E23.144 |
| 7,103,524 B1 * | 9/2006 | Teig | ............ | G06F 30/398 703/14 |
| 7,861,194 B2 | 12/2010 | Ozawa | | |
| 8,239,804 B2 * | 8/2012 | Elfadel | ............ | G06F 30/367 716/124 |
| 8,302,051 B2 * | 10/2012 | Tsunoda | ............ | G06F 30/367 716/111 |
| 8,365,120 B2 * | 1/2013 | Alpert | ............ | G06F 30/394 716/113 |
| 8,386,978 B1 * | 2/2013 | Song | ............ | G06F 30/3312 716/113 |
| 8,516,418 B2 * | 8/2013 | Singh | ............ | G06F 30/30 716/106 |
| 8,751,996 B1 * | 6/2014 | Birch | ............ | G06F 30/394 716/129 |
| 9,230,054 B2 * | 1/2016 | Suaya | ............ | G06F 30/367 |
| 9,330,215 B2 | 5/2016 | Tsai et al. | | |
| 9,379,053 B2 * | 6/2016 | Terui | ............ | H01L 27/11803 |
| 9,886,541 B2 | 2/2018 | Allen et al. | | |
| 10,013,522 B2 | 7/2018 | Visvardis et al. | | |
| 10,360,338 B2 | 7/2019 | Cellier et al. | | |
| 10,762,259 B1 * | 9/2020 | Ershov | ............ | G06F 30/39 |
| 2004/0216062 A1 | 10/2004 | Fan | | |
| 2006/0043426 A1 | 3/2006 | Ozawa | | |
| 2015/0269303 A1 | 9/2015 | Tsai | | |
| 2016/0342729 A1 | 11/2016 | Visvardis | | |
| 2017/0161422 A1 | 6/2017 | Allen | | |
| 2017/0206299 A1 | 7/2017 | Cellier | | |
| 2018/0157783 A1 * | 6/2018 | Moroz | ............ | G06F 30/394 |
| 2019/0008042 A1 * | 1/2019 | Akiyama | ............ | H05K 1/024 |

OTHER PUBLICATIONS

El-Moselhy et al.; "A capacitance solver for incremental variation-aware extraction"; 2008 IEEE/ACM International Conference on Computer-Aided Design; Conference Paper | Publisher: IEEE (Year: 2008).*

Shomalnasab et al.; "Analytic modeling of interconnect capacitance in submicron and nanometer technologies"; 2013 IEEE International Symposium on Circuits and Systems (ISCAS); Conference Paper | Publisher: IEEE (Year: 2013).*

Rutenbar et al.; "Wire packing—a strong formulation of crosstalk-aware chip-level track/layer assignment with an efficient integer programming solution"; IEEE Transactions on Computer-Aided Design of Integrated Circuits and Systems; vol. 20, Issue: 5 | Journal Article | Publisher: IEEE (Year: 2001).*

Narain D. Arora et al., "Modeling and Extraction of Interconnect Capacitances for Multilayer VLSI Circuits," IEEE Trans. Computer-Aided Design of Integrated Circuits and System, 15:1, Jan. 1996, p. 58-67.

Wenjian Yu et al., "Capacitance Extraction," book chapter in Encyclopedia of RF and Microwave Engineering, Apr. 2005, p. 1-11.

* cited by examiner

EXTRACTING PARASITIC CAPACITANCE FROM CIRCUIT DESIGNS

BACKGROUND

The present invention relates to the electrical, electronic, and computer arts, and more specifically, to designing integrated circuits.

Parasitic capacitance is a feature of any integrated circuit design. Parasitic capacitance occurs when different charges are present on adjacent wires that are separated by dielectric in the back-end-of-line (BEOL) portion of a circuit. The differing charges can momentarily generate voltage between the wires, which can confound the intended scheme of voltages within the circuit and alter the circuit timing. Accordingly, in designing integrated circuits, one aspect is to reduce the parasitic capacitances within the circuit. Preferably, the reduced parasitic capacitances could be achieved in the design stage before a prototype circuit is fabricated.

SUMMARY

Principles of the invention provide techniques for extracting parasitic capacitance from circuit designs. In one aspect, an exemplary method includes modifying a putative design of an integrated circuit that includes a target wiring layer, a first adjacent wiring layer that is above the target wiring layer, and a second adjacent wiring layer that is below the target wiring layer. Each adjacent wiring layer includes crossing wires that run orthogonal to wires of the target wiring layer. The exemplary method includes receiving the putative design of the integrated circuit; selecting a target wire disposed in the target wiring layer to perform capacitance extraction; identifying lateral neighbors of the target wire in the target wiring layer; defining regions of the target wire where the lateral neighbors are homogeneous in cross-section; for each region of the target wire, calculating a wire pattern for the crossing wires that has uniform individual wire widths above and below the target wire and has the same spacings between wires as in the first and second adjacent wiring layers; within each region of the target wire, identifying segments within above and below portions of the wire pattern, wherein each segment includes a space and half-widths of adjacent wires; for each segment, obtaining a per-unit-length capacitance from a reduced pattern database; extracting a total parasitic capacitance of the combination of wiring patterns by combining the per-unit-length pattern capacitances; assessing impact of the total parasitic capacitance on circuit performance; and in response to the assessment of impact on circuit performance, producing a modified design by modifying the putative design of the integrated circuit to adjust the spacing between wires in at least one of the target wiring layer, the first adjacent wiring layer, and the second adjacent wiring layer.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Prediction of parasitic capacitances with reduced use of computing resources in less time and at lower cost.

Enhanced speed of circuit design modifications in response to predictions of parasitic capacitance.

Enhanced accuracy of parasitic capacitance predictions in reduced time to prediction from initial circuit design.

Reduced design cycle time.

Reduced number of design iterations.

Improved efficiency of circuit designers.

Optimized designs that operate at intended specifications.

Improved performance of integrated circuits that are designed using aspects of the invention as compared to those designed by conventional methods, at least under conditions where there is an identical CPU time budget for the design process.

These and other features and advantages of the present invention will become apparent from the following detailed description of illustrative embodiments thereof, which is to be read in connection with the accompanying drawings.

DETAILED DESCRIPTION

Figure 1:
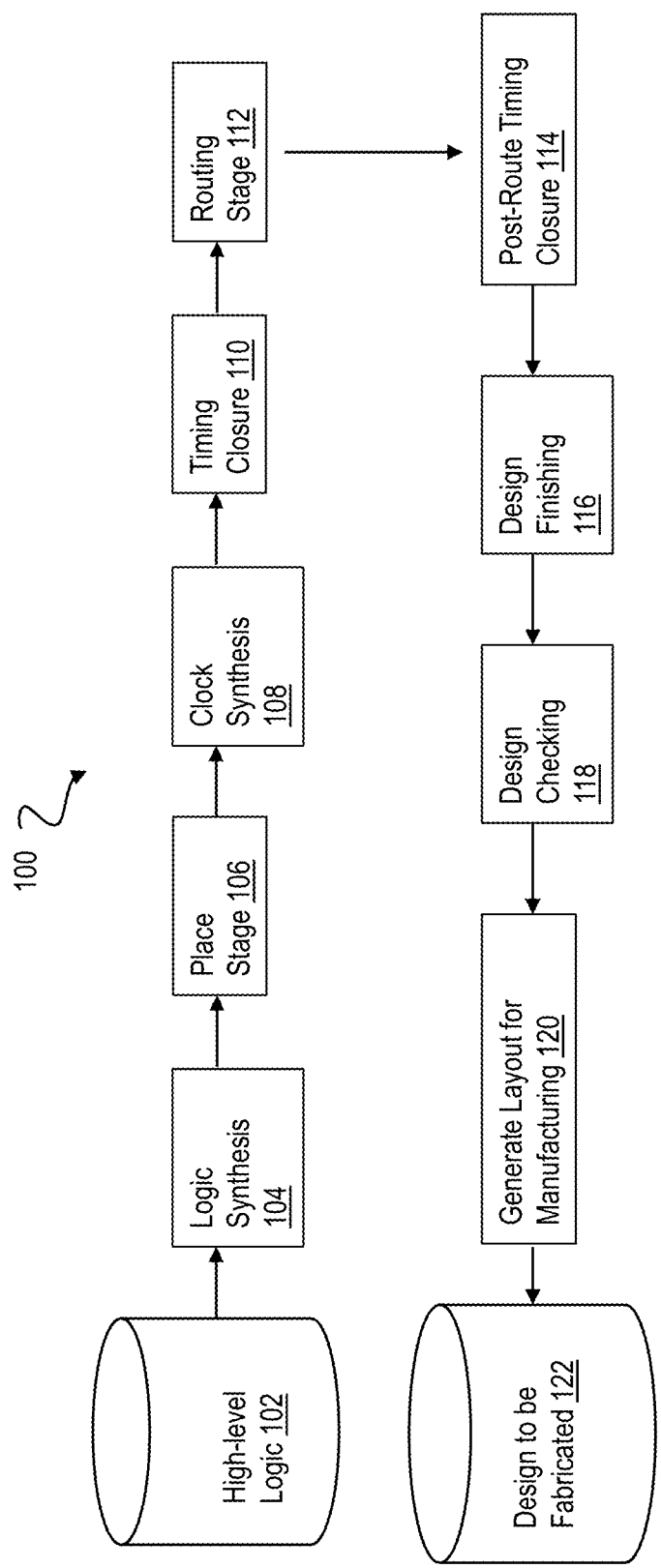
FIG. 1 depicts an example high-level Electronic Design Automation (EDA) tool flow, according to an exemplary embodiment.

FIG. 1 depicts an example high-level Electronic Design Automation (EDA) tool flow 100, which is responsible for creating an optimized microprocessor (or other) design to be manufactured. A designer could start with a high-level logic description 102 of the circuit (e.g. VHDL or Verilog). The logic synthesis tool 104 compiles the logic, and optimizes it without any sense of its physical representation, and with estimated timing information. The placement tool 106 takes the logical description and places each component, looking to minimize congestion in each area of the design. The clock synthesis tool 108 optimizes the clock tree network by cloning/balancing/buffering the latches or registers. The timing closure step 110 performs a number of optimizations on the design, including buffering, wire tuning, and circuit repowering; its goal is to produce a design which is routable, without timing violations, and without excess power consumption. The routing stage 112 takes the placed/optimized design, and determines how to create wires to connect all of the components, without causing manufacturing violations. Post-route timing closure 114 performs another set of optimizations to resolve any violations that are remaining after the routing. Design finishing 116 then adds extra metal shapes to the netlist, to conform with manufacturing requirements. The checking steps 118 analyze whether the design is violating any requirements such as manufacturing, timing, power, electromigration or noise. When the design is clean, the final step 120 is to generate a layout for the design, representing all the shapes to be fabricated. The result is a design to be fabricated 122. At least the checking steps 118 can result in re-design of the circuit going back at least to the routing stage 112 and sometimes as far back as the placement tool 106.

Embodiments of the invention relate to the checking steps 118. More particularly, embodiments of the invention are directed to improved methods for extracting parasitic capacitances from the design as it exists after design finishing 116. The improved methods according to aspects of the invention enable faster and more accurate extraction of capacitances using less computer power than by previous methods. Accordingly, embodiments of the invention enable quicker iteration of circuit designs to converge at allowable values of design variables such as parasitic capacitance.

"Extracting parasitic capacitances" refers to a design process step in which the unwanted capacitances between various circuit elements are calculated. One mode for extracting capacitances is to use a "field solver" that models the actual wire shape geometry and dielectrics with an algorithm which solves electrostatic equations for capacitance calculation—either a differential or integral form of Maxwell's equations could be used. The field solver approach is very compute-intensive and can take about one week to complete to an acceptable accuracy for a moderate sized macro of 50,000 nets, even using sophisticated parallel-processing computing hardware.

According to an exemplary embodiment, during the step of extracting parasitic capacitances from a circuit design, a reduced pattern database is used to provide fast/accurate extraction results. The reduced pattern database includes a number of regularly repeating wire patterns above and below the target wire. Different embodiments of the invention use different reduced pattern databases. For each pattern in a pattern set, a field solver finds the capacitance per unit length for an infinitely repeating pattern of the crossing wire pattern. Key values (related to the crossing wires) that will define each distinct pattern include the cumulative crossing wire widths (above and below the target) and the discrete crossing wire spacings (both above and below the target). Allowing for infinite granularity in wire spacings and widths would of course lead to an infinite pattern set. However, it is possible to intelligently constrain the granularity of these values and still produce a working system.

For those skilled in the art, there is an understanding that the technology node one uses to build a chip will place some constraints on acceptable wire widths and spacings on any given metal layer. These considerations provide some natural bounds for the number of patterns by specifying min/max widths and spacings for wires. Additionally, there are some physical limits that one might use to set the upper/lower bounds of these values. For example, one might say that if the spacing between wires goes above a certain threshold, treat the distance between wires as infinite. Once upper and lower bounds for these sizes are set, one could then determine how many intermediate sizes one would like to consider in a pattern set. For example, if wire widths are limited to being between 100 nm and 200 nm, one could decide to generate patterns at even intervals of 10 nm between the min and max settings, resulting in eleven allowable wire widths. Of course, the sampling does not need to be uniform, as one might choose to use, for example, samples of 100 nm, 120 nm, 160 nm, 200 nm if that fits the most common wire usage in a design paradigm. One pertinent aspect is that it is possible to develop reasonable constraints on the rules used to generate this reduced pattern database to prevent its size from becoming intractable for real computation. Also, it should be noted that the potential number of wire width/spacing combinations existing in any reduced pattern database pales in comparison to the number of distinct wire patterns possible in a design, where each wire to be analyzed might contain hundreds of crossing wires with varying widths and spacings.

If the extraction engine encounters a real wire pattern using crossing wire spacing/wire widths not in the proposed reduced pattern database, one can simply round the observed measurement to the closest one available in the pattern set and use those results. Following the sample above, one might use a 120 nm pattern as the closest existing pattern to a 125 nm wide wire. Given the teachings herein, the skilled artisan can adjust the granularity of the pattern set to balance the pattern set size vs. the loss in accuracy due to imperfect indexing into the data base.

It is observed that the BEOL (back end of the line) wiring of current chip technologies alternates dominant direction through the sequence of metal layers, and as a consequence, it is safe to assume that the wiring immediately above and below the target wire will be predominantly in a direction orthogonal to that of the target, and that the wiring two layers above and below the target will be predominantly in a direction parallel to that of the target. See FIG. 2, which depicts typical BEOL wiring 200 that includes a target wire 202, lateral neighbors 204, crossing wires 206 immediately above the target wire 202, crossing wires 208 immediately below the target wire 202, and distal wires 210, 212. The target wire 202, its lateral neighbors 204, and the distal wires 210, 212 define a target wiring layer 214. The crossing wires 206 define a first adjacent wiring layer 216. The crossing wires 208 define a second adjacent wiring layer 218. Note that FIG. 2 presumes uniform widths and spacing between the crossing wires 206 and between the crossing wires 208. This is a useful presumption for assembling a reduced pattern database, for reasons further discussed below.

Certain principles can be inferred from the results of a field solver operating on a sufficiently large number of sample wiring patterns. One particularly useful principle is that for a target shape (a shape for which capacitances are to be calculated), the topology of the lateral shapes (where lateral shapes refer to parallel wires on the same plane as the target wire) to that target is relatively constant for the length of the target; that is, relatively few distinct lateral shapes will exist. Another principle is that, without significant loss of accuracy, the capacitance analysis can be subdivided based on regions of uniform lateral wiring, solving each independently, and combining results to get a total capacitance.

Figure 3:
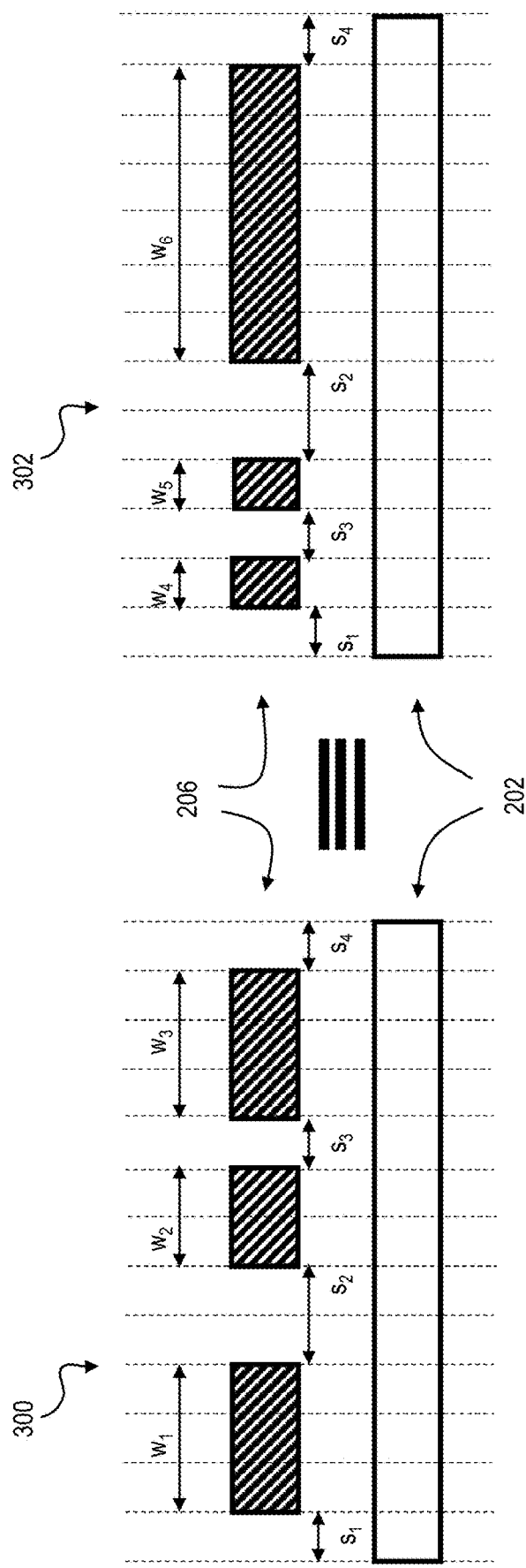
FIG. 3 depicts two wiring patterns with equivalent capacitance, according to an exemplary embodiment.

Another principle is that the capacitance result for a given region, in the presence of above and below crossing wires, with reasonable restrictions to target length, to a high degree of accuracy, depends only on the individual spacings between the above and below crossing wires and the total accumulated widths of these wires, and not the individual wire widths. In one or more embodiments, "reasonable" target length could be around 20 minimum wire widths, similar to what is shown in FIG. 3. Based on a technology, experiments could be made by testing configurations like that of FIG. 3 to find such a length limit. The target region in question, if longer than that length, could be artificially split into sub-regions so that the principle is kept valid.

Figure 2:
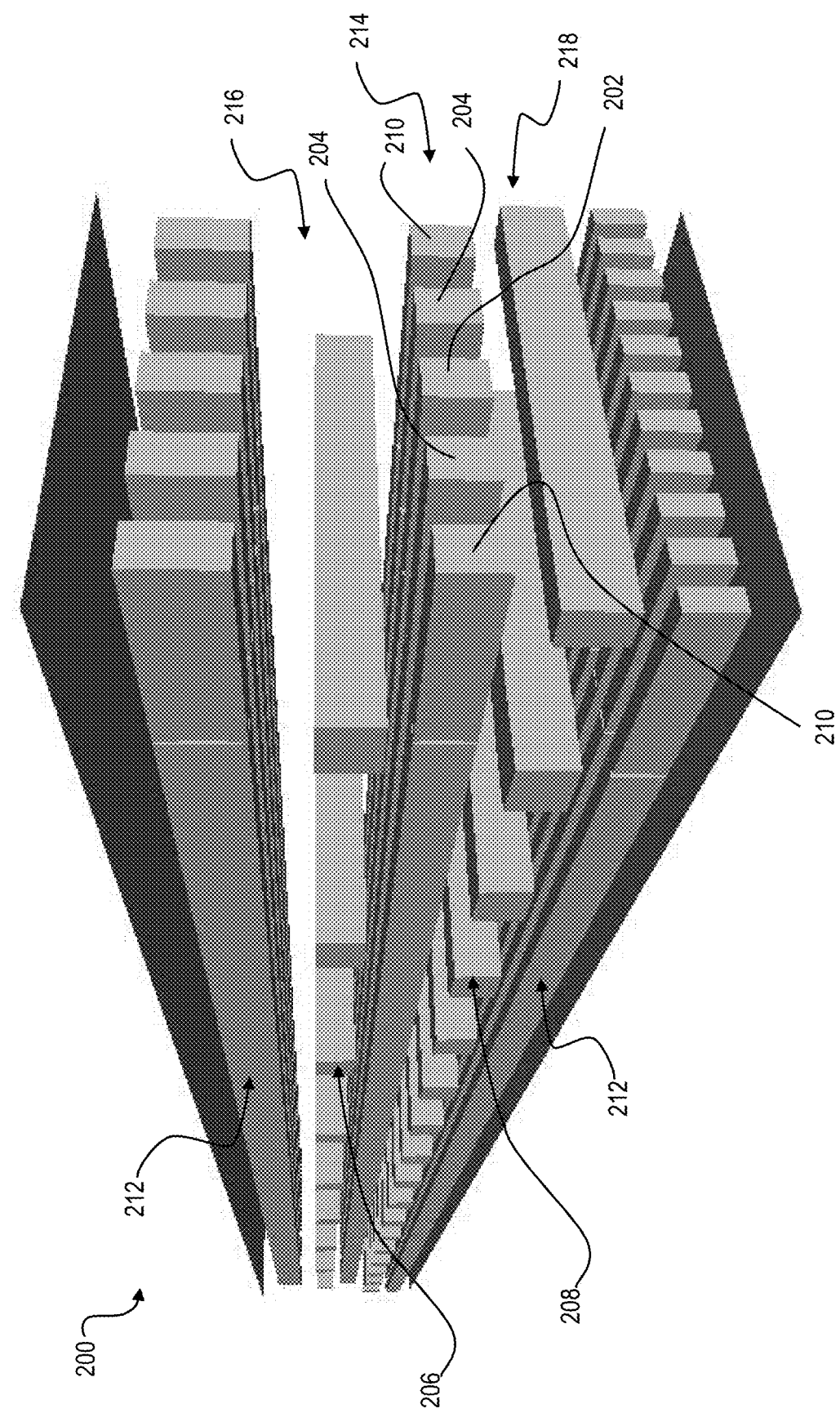
FIG. 2 depicts typical BEOL wiring, according to an exemplary embodiment.

Consider FIG. 3, which depicts two wiring patterns 300, 302 that have differing individual wire widths $w_1$, $w_2$, $w_3$ vs $w_4$, $w_5$, $w_6$ for the crossing wires but have equal individual spacing widths $s_1$, $s_2$, $s_3$, $s_4$ and total wire widths $w_1+w_2+w_3=w_4+w_5+w_6$. Although in practice a wiring pattern would encompass both the above crossing wires 206 and the below crossing wires 208 (as shown in FIG. 2), for convenience FIG. 3 shows only the above crossing wires 206. For the two wiring patterns 300, 302, a field solver produced substantially equivalent unit-length capacitances.

Another interesting principle is that the capacitance result, in the presence of above and below crossing wires, with reasonable restrictions to target length, to a high degree of accuracy, does not depend on the order of the spacings in the above and below crossing wires. This can be seen in FIG. 3. Refer to the discussion of reasonableness above; similar considerations apply here.

Figure 4:
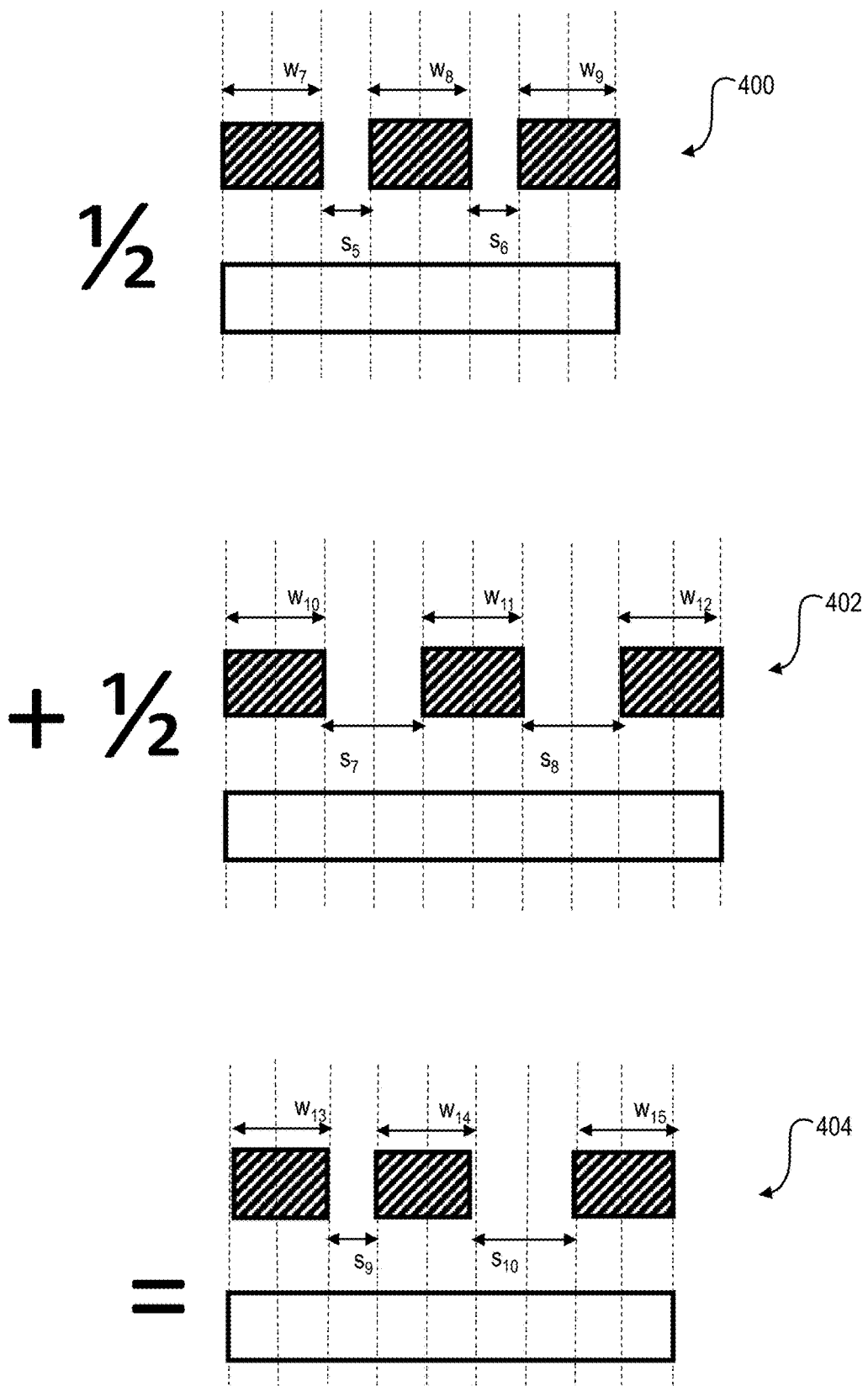
FIG. 4 depicts two wiring patterns that are averaged to have equivalent capacitance to a third wiring pattern, according to an exemplary embodiment.

Consider also FIG. 4, which depicts two wiring patterns 400, 402 that average to be equivalent to a third wiring pattern 404. Wiring pattern 400 has total wire width 6 units, individual wire widths $w_7=w_8=w_9=2$ units, and individual space widths $s_5=s_6=1$ unit. Wiring pattern 402 has total wire width 6 units, individual wire widths $w_{10}=w_{11}=w_{12}=2$ units, and individual space widths $s_7=s_8=2$ units. Wiring pattern 404 has total wire width 6 units, individual wire widths $w_{13}=w_{14}=w_{15}=2$ units, and individual space widths $s_9=1$ unit, $s_{10}=2$ units. Empirically, based on field solver results, wiring pattern 404 has unit-length capacitance equal to an average of the unit-length capacitances of wiring patterns 400, 402.

Figure 5:
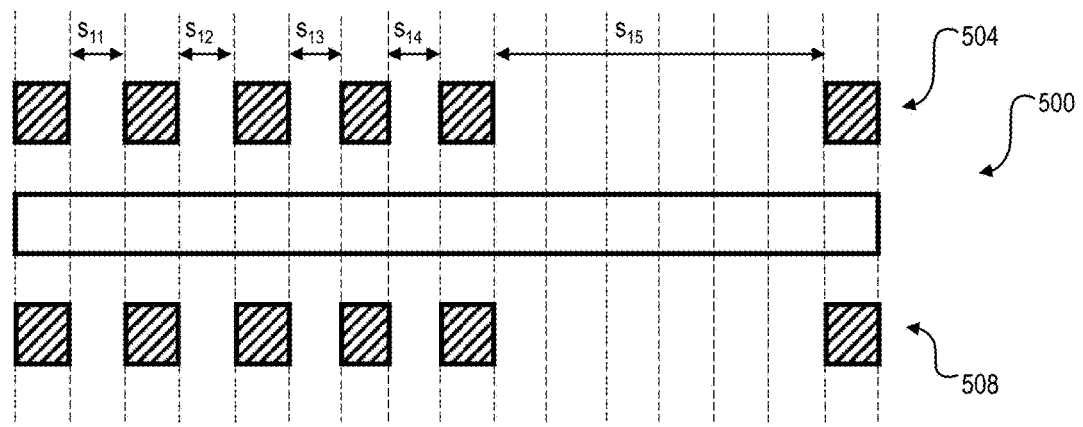
FIG. 5 depicts two wiring patterns with equivalent capacitance, according to an exemplary embodiment.
Figure 5:
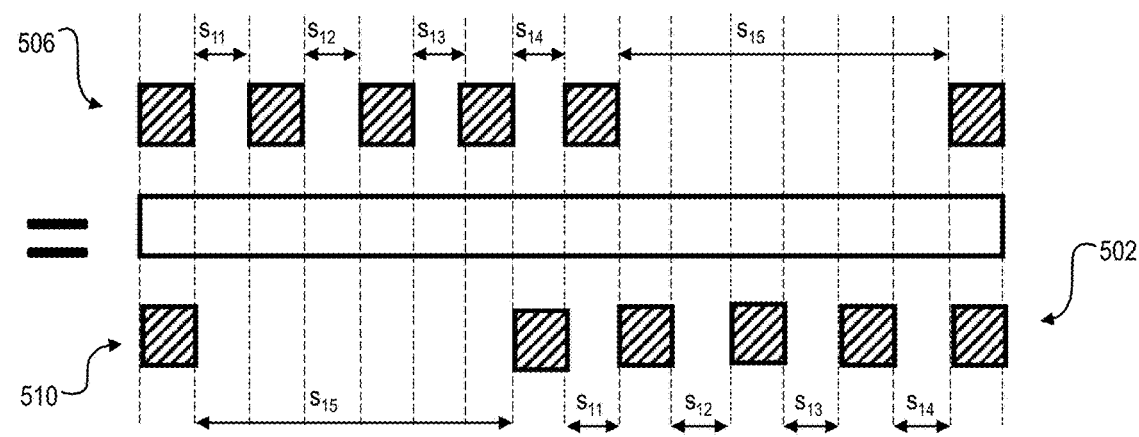

A further principle is that the capacitance result, in the presence of above and below crossing wires, with reasonable restrictions to target length, to a high degree of accuracy, does not depend on the alignment of the spacings in the above and below crossing wires. See FIG. 5, which depicts two wiring patterns 500, 502 that have equivalent capacitance. In each wiring pattern the spaces of the above crossing wires 504, 506 and of the below crossing wires 508, 510 are $s_{11}=s_{12}=s_{13}=s_{14}=1$ unit, $s_{15}=6$ units while the total wire width is 6 units. Although the spaces and wires are in different orders and alignments in wiring pattern 500 than in wiring pattern 502, a field solver produced equivalent capacitances for both wiring patterns. Refer to the discussion of reasonableness above; similar considerations apply here.

Considering the aforementioned principles, the number of patterns sufficient for accurate extraction is greatly reduced since the patterns can be reduced to uniform width, evenly spaced crossing wire patterns—every possible wide width and spacing combination does not have to be recognized and processed by a field solver and stored. Indeed, in one or more embodiments, each wiring pattern of the reduced pattern database has a first uniform wire width and a first uniform wire spacing in segments of a first adjacent wiring layer and has a second uniform wire width and a second uniform wire spacing in segments of a second adjacent wiring layer (opposite the first adjacent wiring layer across a target wiring layer), and the first and second uniform wire width and wire spacings are the same or different among each of the wiring patterns. In extracting the capacitance of an arbitrary wiring layout, field solutions for suitable patterns can be retrieved from the reduced pattern database, interpolated, and combined to arrive at acceptably accurate estimates of parasitic capacitance. Accordingly, for a typical wiring layer, only several thousand such patterns would be needed in contrast to probably several million suggested in the literature to achieve similar accuracy, which would likely be intractable for a typical capacitance extraction implementation.

Figure 6:
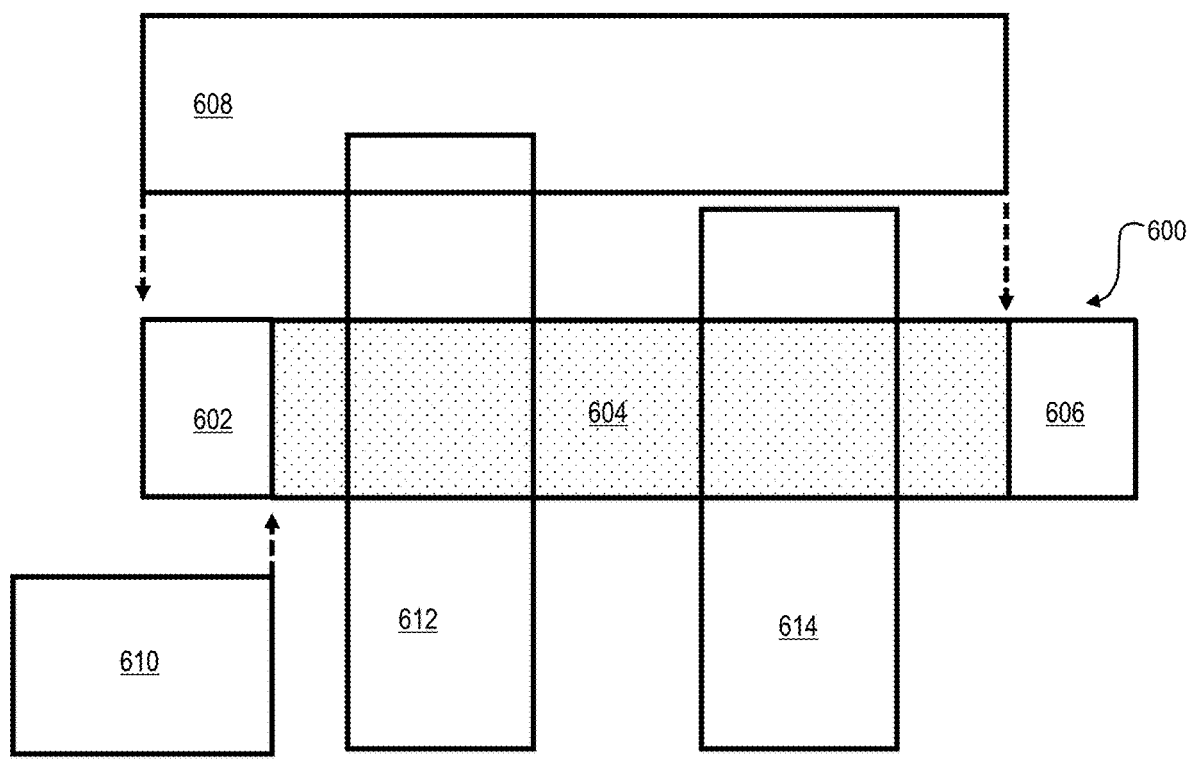
FIG. 6 depicts partitioning a target wire into regions that correspond to homogeneous lateral neighbor conditions, according to an exemplary embodiment.

Retrieval of suitable patterns can be accomplished per-region rather than for the entirety of a target wire. The extracted capacitances of the per-region patterns then can be summed to obtain an extracted capacitance for the entire target wire. For example, FIG. 6 depicts partitioning a target wire 600 into regions 602, 604, 606 that correspond to homogeneous lateral neighbor conditions. In region 602, the target wire 600 has two lateral neighbors 608 and 610. In region 604, the target wire 600 has only the neighbor 608. In region 606, the target wire 600 has no neighbors. Neighbors 608, 610 produce parasitic capacitances with the target wire 600 within regions 602, 604. Within region 604, two crossing wires 612, 614 also produce parasitic capacitance with the target wire 600. A total parasitic capacitance for the target wire 600 can be extracted by retrieving a pattern for the region 602 and its corresponding capacitance, and by retrieving a pattern for the region 604 and its corresponding capacitance, then summing the partial capacitances. In the example of FIG. 6, there is no pattern for the region 606 because there the target wire 600 has no neighbors or crossing wires to produce capacitances. In other instances, it may be unusual for any region to not have anything coupled to it on any of its four sides.

Figure 7:
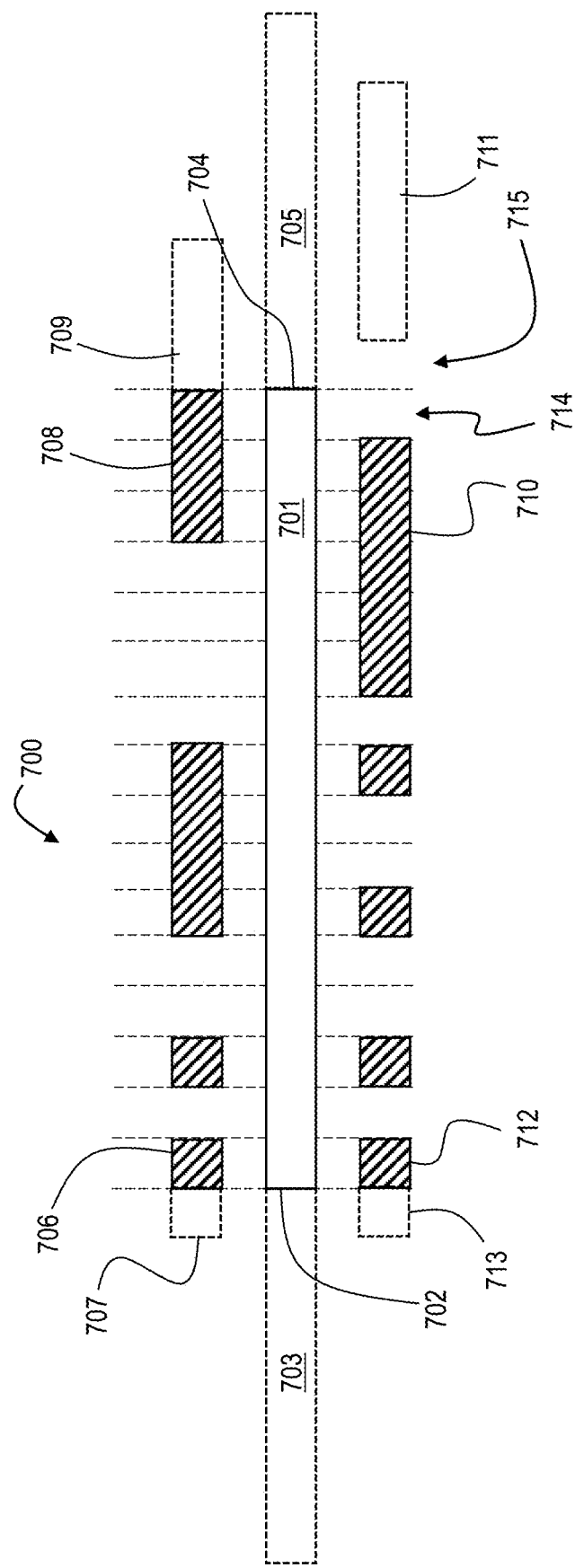
FIG. 7 depicts an approximation of end effects for a wire pattern surrounding a target wire, according to an exemplary embodiment.

FIG. 7 depicts an approximation of end effects for a wire pattern 700 surrounding a target region 701. Crossing wires and spaces at the ends 702, 704 of the target region 701 are presumed to "reflect" beyond the ends. The target region 701 also is reflected in a left end image 703 and a right end image 705. For example, crossing wires 706 and 708 above the target region 701, as well as crossing wires 710 and 712 below the target region 701, have reflections 707, 709, 711, and 713 respectively. Meanwhile, space 714 has a reflection 715.

Figure 8:
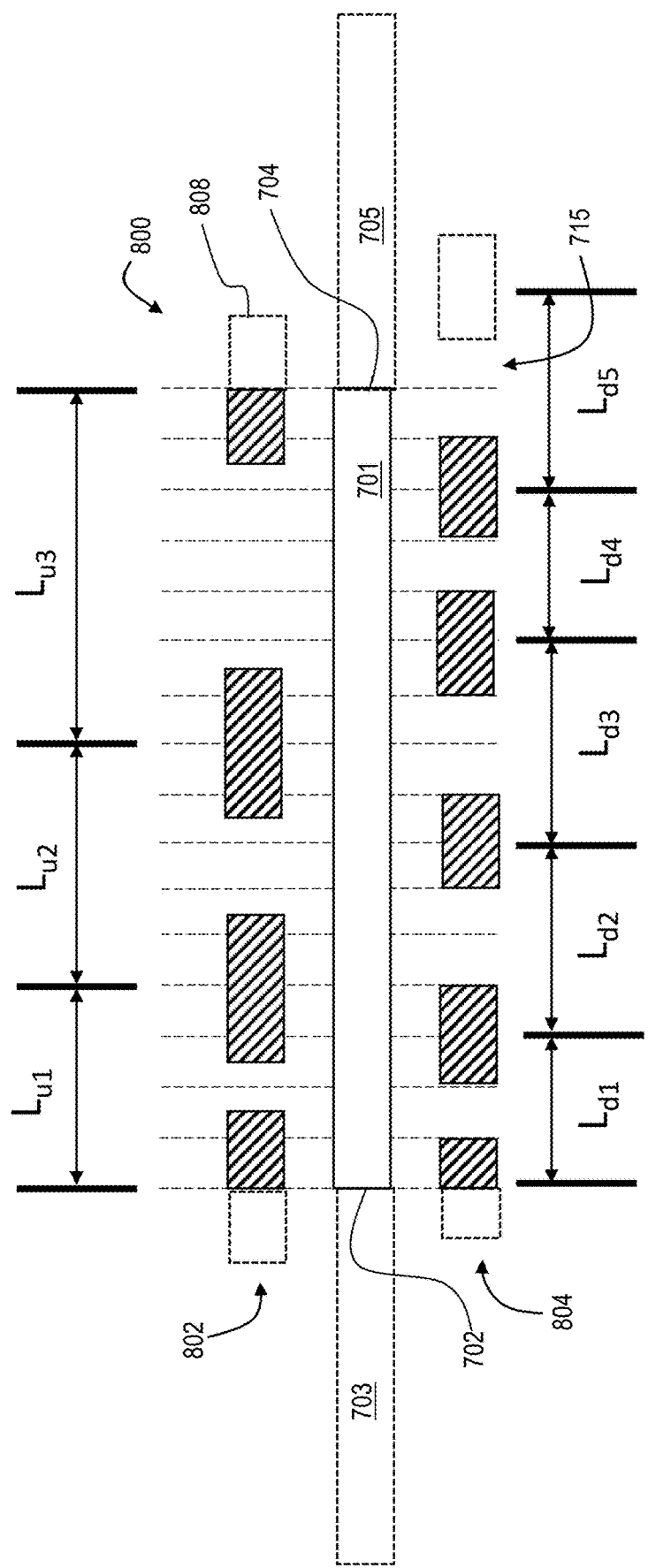
FIG. 8 depicts a wire pattern equivalent to the wire pattern of FIG. 7, in which wire widths of above and below crossing wires have been equalized including the widths of the reflections, while space widths have been preserved including the width of a reflected space, according to an exemplary embodiment.

FIG. 8 depicts another wire pattern 800, which has equivalent capacitance to the wire pattern 700 according to the principles discussed above. In wire pattern 800, wire widths of the above and below crossing wires 802, 804 have been equalized within the length of the target region, while space widths have been preserved including the width of the reflected space 715. The equalization of total wire width includes the reflections of crossing wires that overlap the target region's ends 702, 704. For example, equalized crossing wire 808 has width of 3 units; 1.5 units are within the length of the target region 701 while 1.5 units are reflected beyond the target region's end 704. In both FIG. 7 (wiring pattern 700) and FIG. 8 (equivalent wiring pattern 800), the total wire width within the length of the target region 701 is 9 units and the total space width including reflected space 715 is 8 units. The reason for making the crossing wire widths match is so that, for, e.g. Lu1, the pattern it selects will have a clear width and space value. If the widths to the left and right in Lu1 were not the same, then which pattern to select is ambiguous. The reason for considering reflected "ghost" shapes outside the target region is more for justification of, for example, choosing a crossing-wire center point to establish the left edge of Lu1. So only the non-ghost portion is considered for target shape 701, and the combined non-ghost widths must match the original widths that overlap 701.

Another aspect of the invention is how to arrive at the widths shown in FIG. 8. The algorithm would be applied independently to the above and the below crossing wires. The goal is to have each crossing wire have the same width, with crossing wires touching the ends having ½ that width, and the total of the crossing wire widths match the original sum of widths. This can be determined as follows: Count the number of spacings in the crossing wires over the target region, $n_s$. Count $n_e$: how many crossing wires continue past or end at the end of the target. $n_e$ will have a value of 0, 1, or 2. If L is the original total sum of the crossing wire widths, then the adjusted crossing wire width $w_c$ will be $L/(n_s-1+n_e/2)$ for crossing wires not touching the ends of the target, and ½ that for wires touching the target ends. So, for the above crossing wires in FIG. 7 and FIG. 8, $n_s=3$, $n_e=2$, $L=1+1+4+3=9$ (per FIG. 7), so $w_c=9/(3-1+2/2)=3$ with the two end wires having widths of 3/2 which matches that in the above crossing wires of FIG. 8. For the below crossing wires, $n_s=5$, $n_e=1$, $L=1+1+1+1+5=9$, so $w_c=9/(5-1+½)=9/4.5=2$ which matches that in the below crossing wires of FIG. 8.

Figure 9:
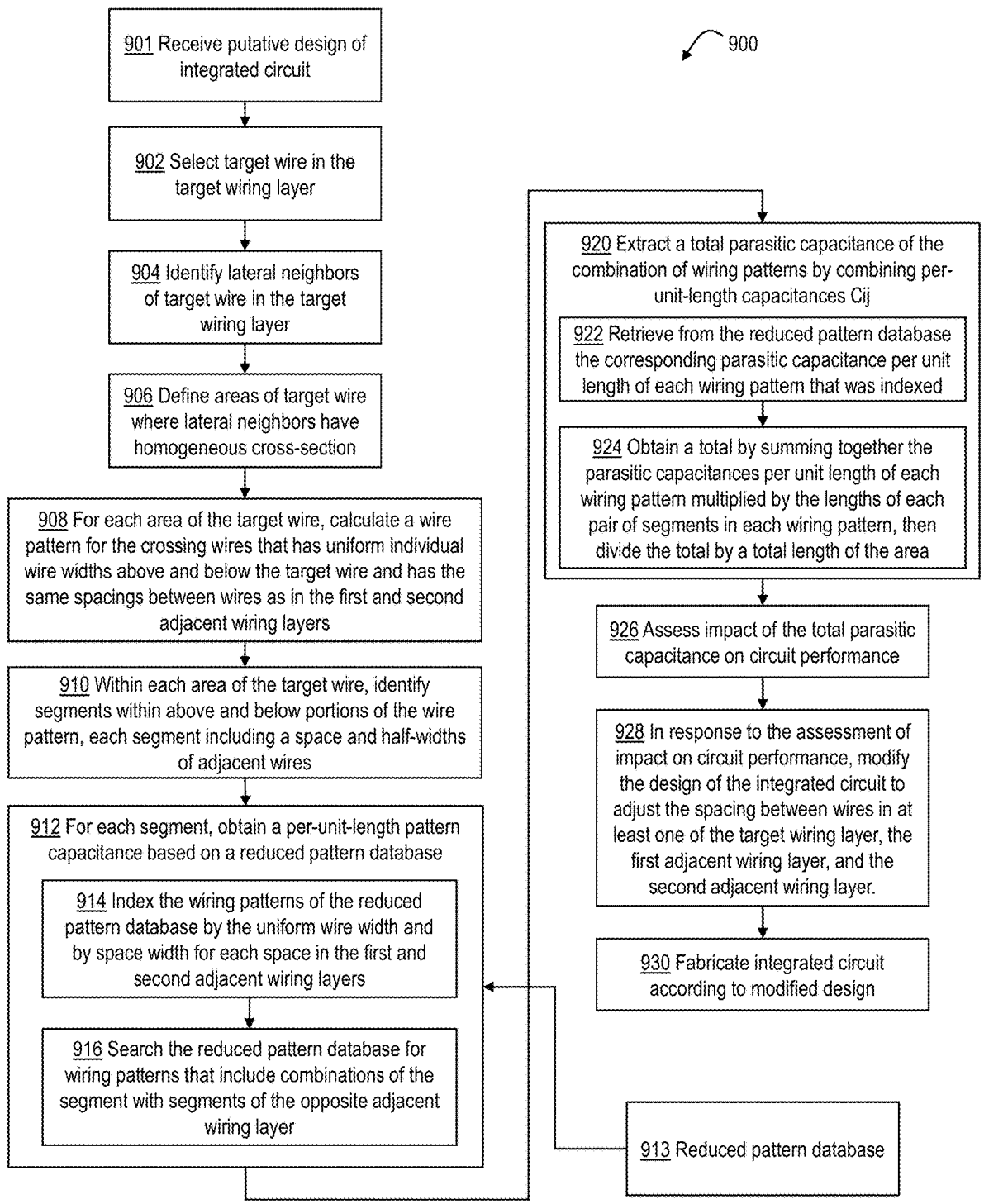
FIG. 9 depicts a method for extracting parasitic capacitances from a circuit design, according to an exemplary embodiment.

Considering the foregoing, FIG. 9 depicts a method 900 for extracting parasitic capacitances from a circuit design during the aforementioned checking steps 118 of FIG. 1. At 901 the method includes receiving a putative design of an integrated circuit. An exemplary circuit design, as shown in FIG. 2, includes the target wire 202, lateral neighbors 204, crossing wires 206 immediately above the target wire 202, crossing wires 208 immediately below the target wire 202, and distal wires 210, 212. The target wire 202, its lateral neighbors 204, and the distal wires 210 define the target wiring layer 214. The crossing wires 206 define the first adjacent wiring layer 216 above the target wiring layer 214. The crossing wires 208 define the second adjacent wiring layer 218 below the target wiring layer 214.

At 902 select the target wire 202 disposed in the target wiring layer 214 to perform capacitance extraction. At 904 identify lateral neighbors 204 of the target wire 202 in the target wiring layer 214. At 906 (with reference to FIG. 6) define regions 602, 604, 606 of the target wire 202 for which the lateral neighbors are homogeneous in cross-section. At 908 for each region of the target wire, calculate a wire pattern for the crossing wires that has uniform individual wire widths above and below the target wire (widths above may be the same as or different than widths below) and has the same spacings between wires as in the first and second adjacent wiring layers 216, 218. At 910, within each region of the target wire, identify segments within above and below portions of the wire pattern, each segment including a space and half-widths of adjacent wires. For example, FIG. 8 depicts segments $L_{u1}$, $L_{u2}$, $L_{u3}$ and $L_{d1}$, $L_{d2}$, $L_{d3}$, $L_{d4}$, $L_{d5}$ within the wiring pattern 800. Reflect the wires and spaces in each adjacent wiring layer 216, 218 at the ends of each region, e.g., at the ends of 602, 604, 606. At 912, obtain a per-unit-length capacitance $C_{ij}$ for each above/below segment combination, identified by a choice of i and a choice of j, based on a reduced pattern database 913. The indices i and j index the $i^{th}$ space above and $j^{th}$ space below. For example, in FIG. 8, index i for values 1, 2, and 3, would identify each of the three segments $L_{u1}$, $L_{u2}$, $L_{u3}$. Similarly, index j would identify each of the five segments $L_{d1}$, $L_{d2}$, $L_{d3}$, $L_{d4}$, $L_{d5}$. Interpolate when necessary to approximate a corresponding pattern, e.g. when there are patterns for 120 nm wire width and two 50 nm spaces or for 130 nm wire width and two 40 nm spaces, and the actual spacing is one 40 nm space and one 50 nm space with 120 nm wire width, combine the two existing patterns to approximate the target capacitance. This supports arbitrary widths and spaces by the interpolation process, which enables width bias. "Width bias" is variations from grid-like widths as a result of semiconductor manufacturing. Accordingly, to account for width bias, a continuous variation in width values is supported, not just a few incremental widths.

Step 912 of obtaining per-unit-length capacitances includes steps 914 and 916. At 914, index the wiring patterns of the reduced pattern database by the wires in the wiring patterns determined in 908 in the first and second adjacent (above and below) wiring layers. At 916, search the reduced pattern database for wiring patterns that include combinations of the segment with segments of the opposite adjacent wiring layer.

In other words, at 914 enumerate the above and below segments by indexes i and j respectively. At 916, for each combination of ith segment above and jth segment below, search the reduced pattern database for wiring patterns that include the above width and space, and the below width and space, associated with those two segments. Such an access will also include the lateral environment for the region, i.e., the target width and the two lateral neighbor spacings and widths. Each such result will include a set of per-unit-length capacitances. Such a set, or vector, of capacitance components consists of typically capacitance to above wires, to lateral wires on each side, and to below wires.

Then at 920, extract the total capacitance of the combination of wiring patterns within the region by combining per-unit-length capacitances $C_{ij}$, where indices i and j denote combinations of segments above the target wiring layer (in the first adjacent wiring layer) and below the target wiring layer (in the second adjacent wiring layer). Thus, at 922 retrieve from the results of 916 the corresponding parasitic capacitance per unit length of each wiring pattern that was indexed. Let $C(s_u, w_u, s_a, w_a)$ represent an entry to be retrieved from the results of 916. Such an entry includes a set, or vector, of capacitance components, typically capacitance to above wires, to lateral wires on each side, and to below wires. FIG. 8 is an example of the general process. Using the spacing of the dashed lines in FIG. 8 as the units of distance, for the $L_{u1}/L_{d1}$ combination, the C(1,3,1,2) table entry is retrieved corresponding to (a) $L_{u1}$ having space of 1 unit and wire of 3 units width in combination with (b) $L_{d1}$ having space of 1 unit and wire of 2 units width. Similarly, for the $L_{u1}/L_{d2}$ combination, C(1,3,2,2) is retrieved. In all, fifteen such combinations (thoroughly permuting FIG. 8)

leads to fifteen table retrievals. At 924, scale each such capacitance set by a factor consisting of the product of the segment lengths of the respective ith and jth segments, then sum all such scaled capacitances and divide the result by the region length to get the final set of capacitances representing the capacitances of the region. In other words, obtain a total by summing together the parasitic capacitances per unit length of each wiring pattern multiplied by the lengths of each pair of segments in each wiring pattern, then divide the total by a total length of the region. Thus, the total capacitance for the example shown in FIG. 8 is:

$$C=[C_{11}L_{u1}L_{d1}+C_{12}L_{u1}L_{d2}+C_{13}L_{u1}L_{d3}+C_{14}L_{u1}L_{d4}+$$
$$0.5*C_{15}L_{u1}L_{d5}+C_{21}L_{u2}L_{d1}+C_{22}L_{u2}L_{d2}+$$
$$C_{23}L_{u2}L_{d3}+C_{24}L_{u2}L_{d4}+0.5*C_{25}L_{u2}L_{d5}+$$
$$C_{31}L_{u3}L_{d1}+C_{32}L_{u3}L_{d2}+C_{33}L_{u3}L_{d3}+C_{34}L_{u3}L_{d4}+$$
$$0.5*C_{35}L_{u3}L_{d5}]/L=[C(1,3,1,2)*4*3+C(1,3,$$
$$2,2)*4*4+C(1,3,2,2)*4*4+C(1,3,1,2)*4*3+0.5*C$$
$$(1,3,2,2)*4*4+C(2,3,1,2)*5*3+C(2,3,2,2)*5*4+$$
$$C(2,3,2,2)*5*4+C(2,3,1,2)*5*3+0.5*C(2,3,$$
$$2,2)*5*4+C(4,3,1,2)*7*3+C(4,3,2,2)*7*4+C(4,$$
$$3,2,2)*7*4+C(4,3,1,2)*7*3+0.5*C(4,3,$$
$$2,2)*7*4]/16,$$

where C represents a vector of capacitances, and the equation applies for each such capacitance. Note the "0.5* ... $L_{d5}$" terms because $L_{d5}$ is split at the end of the region.

Because $L_{d1}=L_{d4}$ and $L_{d2}=L_{d3}=L_{d5}$, only six unique table values are retrieved, and as a result:

$$C=[2*C(1,3,1,2)*4*3+2.5*C(1,3,2,2)*4*4+2*C(2,3,1,$$
$$2)*5*3+2.5*C(2,3,2,2)*5*4+2*C(4,3,1,2)*7*3+$$
$$2.5*C(4,3,2,2)*7*4]/16.$$

More generally, the sum over $(C_{ij}*L_{ui}*L_{dj})$ usually can be arranged into groups where $C_{ij}$ is the per-unit-length capacitance of space/width i above and j below and $L_{ui}$ and $L_{dj}$ are the center-wire to center-wire distances for the above and below patterns respectively. Such groups have the property that, for all members, $L_{ui1}=L_{ui2}$ and $L_{dj1}=L_{dj2}$, and the sum to get C reduces to a sum over such groups, where just one entry per group is included with a factor representing the number of group entries:

$$C=(\text{sum over groups enumerated with } k)[(\text{number of entries in group } k)*(C_{group-k}*L_{u-group-k}*L_{d-group-k})]/L$$

Thus, since unique crosswire spaces will be limited, the above process typically will lead to a drastic simplification of the parasitic capacitance extraction.

This method has shown to give accuracy on, for example, IBM's P- and Z-series server designs to where about 99% of the net capacitance values are within about 4% of what the field solver gives. This compares, for example, to about 46% of net capacitance values within about 4% of field solver, about 85% within about 10% of field solver for a method according to U.S. Pat. No. 6,061,508; about 5× faster than a method according to U.S. Pat. No. 6,061,508. Thus, one or more embodiments improve the performance of the computer running the design process. For the same CPU budget, the process will yield a more accurate result allowing a denser design where there are no issues with parasitic capacitance or allowing correction of the design for greater spacing where there are issues with parasitic capacitance. Alternatively, comparable or better results can be obtained with fewer CPU cycles than prior art techniques.

At 926, assess the impact of the total parasitic capacitance on circuit performance. In one or more embodiments, the assessment can be accomplished by conventional calculations of timing delays and/or circuit noise. In one or more embodiments, the assessment could instead be accomplished by application of machine learning to a listing of total extracted capacitances for some or all of the wires in the target layer. Then at 928, in response to the assessment of impact on circuit performance, modify the design of the integrated circuit to adjust the spacing between wires in at least one of the target wiring layer, the first adjacent wiring layer, and the second adjacent wiring layer. Optionally, at 930 fabricate an integrated circuit according to the modified design.

Figure 10:
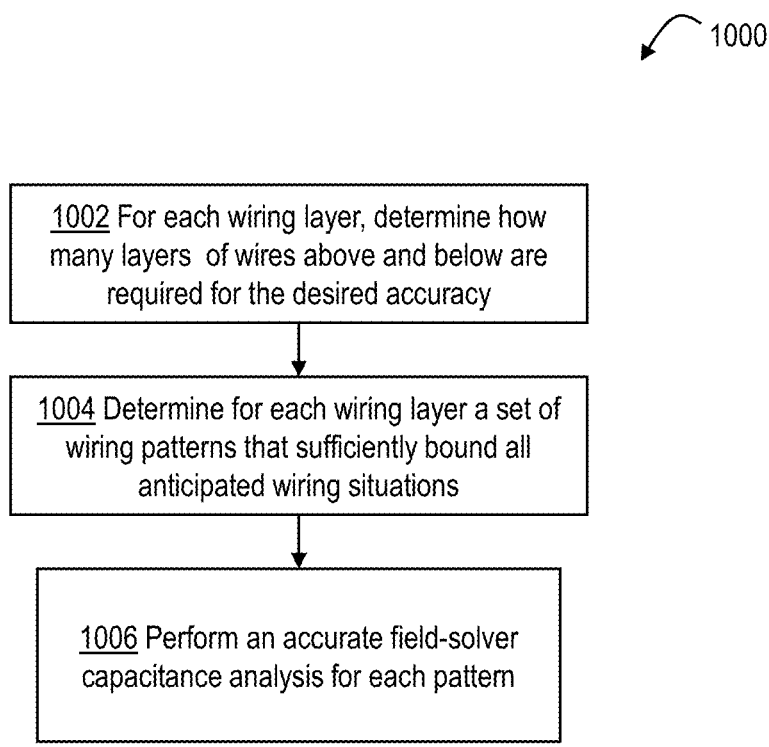
FIG. 10 depicts a method for pre-analysis that supports exemplary embodiments of the invention.

FIG. 10 depicts a method 1000 for pre-analysis to construct a reduced pattern database that supports exemplary embodiments. At 1002, determine how many layers of wires above and below are required for the desired accuracy. In one or more embodiments, one layer above and one layer below are sufficient with an assumed plate two layers above and below to force a conservative answer. At 1004, determine for each wiring layer a set of wiring patterns that sufficiently bound all anticipated wiring situations with the restriction that the layers other than the target layer have common width, evenly spaced wires, and the target length is sufficiently long to make end effects negligible for all anticipated target widths, target neighbor widths, and target neighbor spacings. Note that the choice of space and width for each non-target layer will be independent of that of the other non-target layers. At 1006, perform an accurate field-solver capacitance analysis for each pattern determined in the previous step.

Given the discussion thus far, and with reference to the accompanying drawings, it will be appreciated that, in general terms, an aspect of the invention provides an exemplary method 900 for modifying a putative design of an integrated circuit 200 that includes a target wiring layer 214, a first adjacent wiring layer 216 that is above the target wiring layer, and a second adjacent wiring layer 218 that is below the target wiring layer. Each adjacent wiring layer includes crossing wires 206, 208 that run orthogonal to wires 202, 204, 210 of the target wiring layer. The exemplary method comprises at 901 receiving the putative design of the integrated circuit; at 902 selecting a target wire disposed in the target wiring layer to perform capacitance extraction; at 904 identifying lateral neighbors of the target wire in the target wiring layer; at 906 defining regions of the target wire where the lateral neighbors are homogeneous in cross-section; at 908, for each region of the target wire, calculating a wire pattern for the crossing wires that has uniform individual wire widths above and below the target wire and has the same spacings between wires as in the first and second adjacent wiring layers; at 910, within each region of the target wire, identifying segments within above and below portions of the wire pattern, wherein each segment includes a space and half-widths of adjacent wires; at 912, for each segment, obtaining a per-unit-length capacitance from a reduced pattern database; at 920 extracting a total parasitic capacitance of the combination of wiring patterns by combining the per-unit-length pattern capacitances; at 926 assessing impact of the total parasitic capacitance on circuit performance; and at 928, in response to the assessment of impact on circuit performance, producing a modified design by modifying the putative design of the integrated circuit to adjust the spacing between wires in at least one of the target wiring layer, the first adjacent wiring layer, and the second adjacent wiring layer. An ordinary skilled worker will appreciate that it may be desirable to diminish the spacing between wires, so as to increase circuit density and speed, so long as parasitic capacitance is below some threshold value; on the other hand, if parasitic capacitance exceeds a threshold value, it will be desirable to increase the wire spacing.

In one or more embodiments, obtaining the per-unit-length capacitance for a segment includes at 914 indexing the wiring patterns of the reduced pattern database by the uniform wire width and by space width for each space in the first and second adjacent wiring layers and at 916 searching the reduced pattern database for wiring patterns that include combinations of the segment with segments of the opposite adjacent wiring layer. In one or more embodiments, each of the wiring patterns of the reduced pattern database has a first uniform wire width and a first uniform wire spacing in the segments of the adjacent wiring layer and has a second uniform wire width and a second uniform wire spacing in the segments of the opposite adjacent wiring layer, wherein the first and second uniform wire width and wire spacings are the same or different among each of the wiring patterns. In one or more embodiments, for each wiring pattern the reduced pattern database includes a corresponding per-unit-length capacitance. In one or more embodiments, extracting the parasitic capacitance of the combination of wiring patterns includes at 922 retrieving from the reduced pattern database the corresponding parasitic capacitance per unit length of each wiring pattern that was indexed. In one or more embodiments, extracting the parasitic capacitance of the combination of wiring patterns includes at 924 obtaining a total by summing together the parasitic capacitances per unit length of each wiring pattern multiplied by the lengths of each pair of segments in each wiring pattern, then dividing the total by a total length of the region.

In one or more embodiments, the method 900 also includes at 930 fabricating an integrated circuit according to the modified design.

Figure 11:
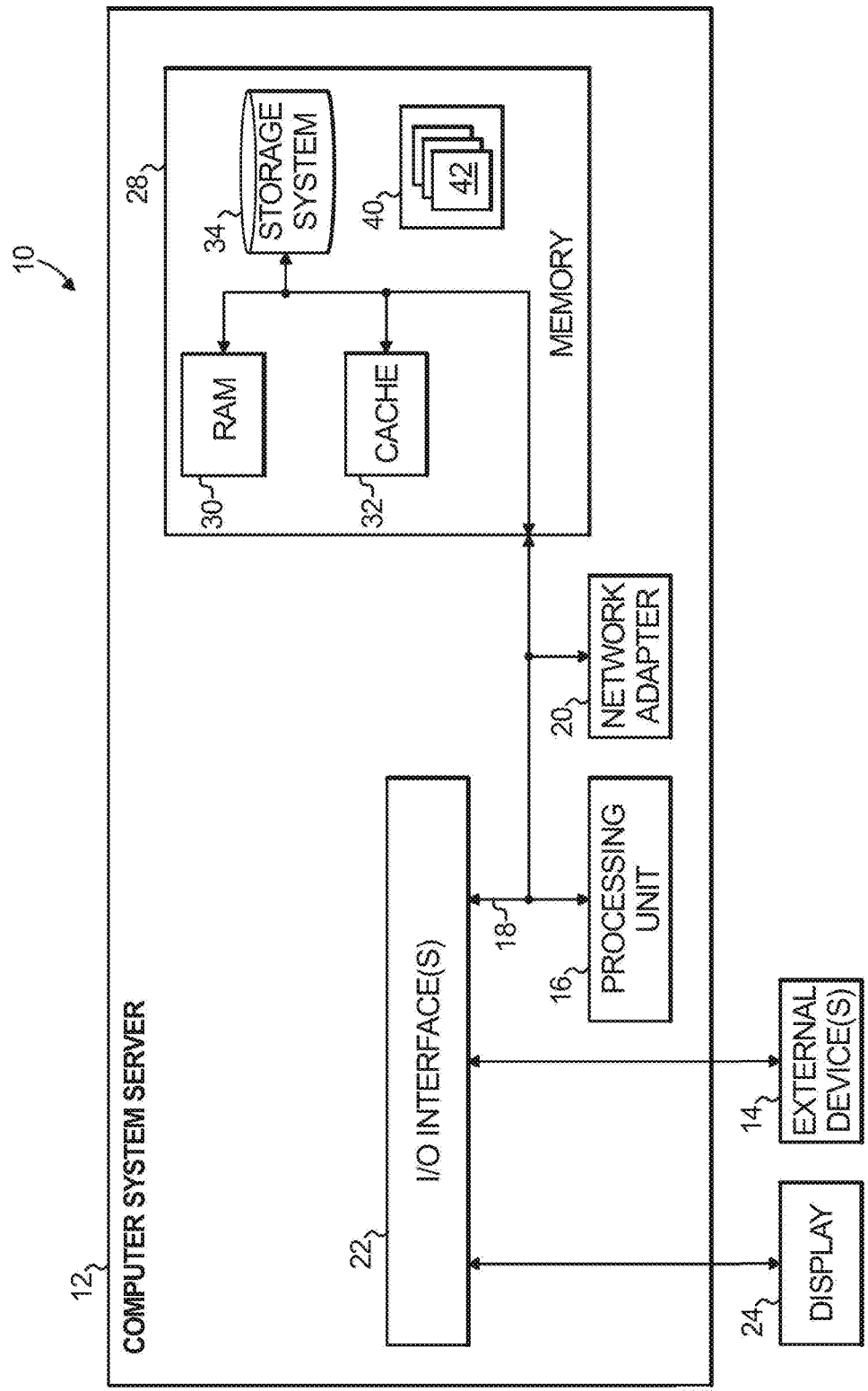
FIG. 11 depicts a computer system suitable for implementing exemplary embodiments of the invention.

One or more embodiments of the invention, or elements thereof (e.g. design process), can be implemented in the form of an apparatus including a memory and at least one processor that is coupled to the memory and operative to facilitate exemplary method steps, or in the form of a non-transitory computer readable medium embodying computer executable instructions which when executed by a computer cause the computer to facilitate exemplary method steps. FIG. 11 depicts a computer system that may be useful in implementing one or more aspects and/or elements of the invention. Referring now to FIG. 11, computer system 10 is only one example of a suitable computing system and is not intended to suggest any limitation as to the scope of use or functionality of embodiments of the invention described herein.

In computer system 10 there is a server 12, which is operational with numerous other general purpose or special purpose computing system environments or configurations. Examples of well-known computing systems, environments, and/or configurations that may be suitable for use with server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Server 12 may be described in the general context of computer system executable instructions, such as program modules, being executed by a computer system. Generally, program modules may include routines, programs, objects, components, logic, data structures, and so on that perform particular tasks or implement particular abstract data types. Server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, server 12 in computer system 10 is shown in the form of a general-purpose computing device. The components of server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 12 typically includes a variety of computer system readable media. Such media may be any available media that is accessible by server 12, and it includes both volatile and non-volatile media, removable and non-removable media.

System memory 28 can include computer system readable media in the form of volatile memory, such as random access memory (RAM) 30 and/or cache memory 32. Server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Server 12 may also communicate with one or more external devices 14 such as a keyboard, a pointing device, a display 24, etc.; one or more devices that enable a user to interact with server 12; and/or any devices (e.g., network card, modem, etc.) that enable server 12 to communicate with one or more other computing devices. Such communication can occur via Input/Output (I/O) interfaces 22. Still yet, server 12 can communicate with one or more networks such as a local area network (LAN), a general wide area network (WAN), and/or a public network (e.g., the Internet) via network adapter 20. As depicted, network adapter 20 communicates with the other components of server 12 via bus 18. It should be understood that although not shown, other hardware and/or software components could be used in conjunction with server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 11, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 11) running a server program. It will be understood that such a physical server may or may not include a display and keyboard.

One or more embodiments can be at least partially implemented in the context of a cloud or virtual machine environment, although this is exemplary and non-limiting.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary Design Process Used in Semiconductor Design, Manufacture, and/or Test

Figure 12:
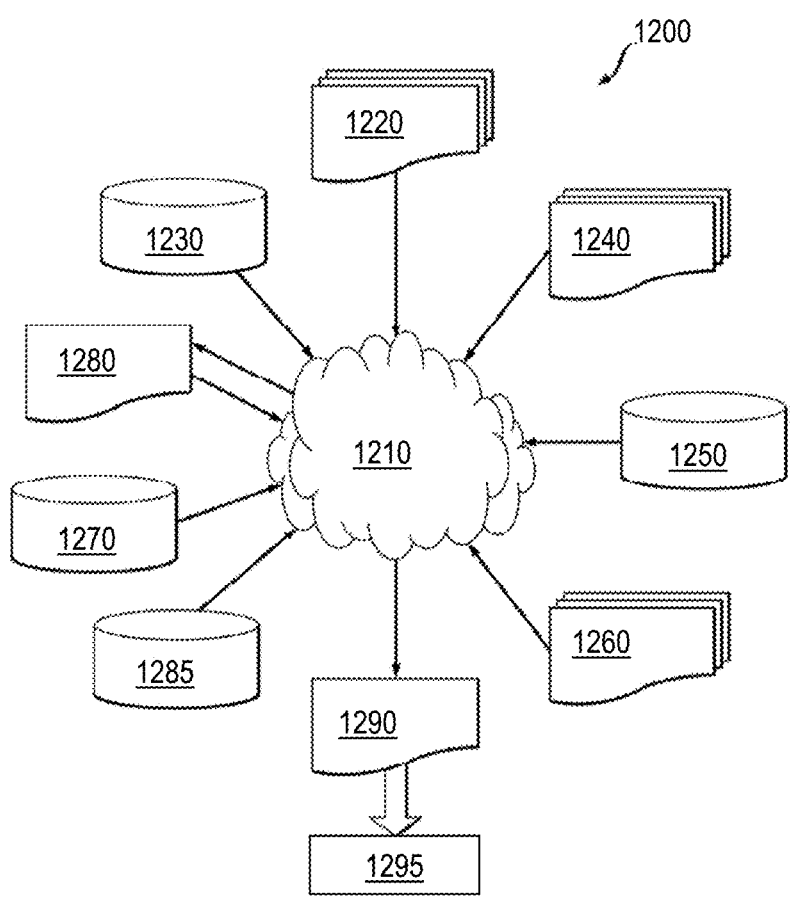
FIG. 12 depicts an exemplary high-level Electronic Design Automation (EDA) tool flow, within which aspects of the invention can be employed.

One or more embodiments integrate the parasitic capacitance extraction techniques herein with semiconductor integrated circuit design simulation, test, layout, and/or manufacture. In this regard, FIG. 12 shows a block diagram of an exemplary design flow 1200 used for example, in semiconductor IC logic design, simulation, test, layout, and manufacture. Design flow 1200 includes processes, machines and/or mechanisms for processing design structures or devices to generate logically or otherwise functionally equivalent representations of design structures and/or devices, such as those that can be analyzed using parasitic capacitance extraction or the like. The design structures processed and/or generated by design flow 1200 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1200 may vary depending on the type of representation being designed. For example, a design flow 1200 for building an application specific IC (ASIC) may differ from a design flow 1200 for designing a standard component or from a design flow 1200 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1220 that is preferably processed by a design process 1210. Design structure 1220 may be a logical simulation design structure generated and processed by design process 1210 to produce a logically equivalent functional representation of a hardware device. Design structure 1220 may also or alternatively comprise data and/or program instructions that when processed by design process 1210, generate a functional representation of the physical structure of a hardware device. Whether representing functional and/or structural design features, design structure 1220 may be generated using electronic computer-aided design (ECAD) such as implemented by a core developer/designer. When encoded on a gate array or storage medium or the like, design structure 1220 may be accessed and processed by one or more hardware and/or software modules within design process 1210 to simulate or otherwise functionally represent an electronic component, circuit, electronic or logic module, apparatus, device, or system. As such, design structure 1220 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1210 preferably employs and incorporates hardware and/or software modules for synthesizing, translating, or otherwise processing a design/simulation functional equivalent of components, circuits, devices, or logic structures to generate a Netlist 1280 which may contain design structures such as design structure 1220. Netlist 1280 may comprise, for example, compiled or otherwise processed data structures representing a list of wires, discrete components, logic gates, control circuits, I/O devices, models, etc. that describes the connections to other elements and circuits in an integrated circuit design. Netlist 1280 may be synthesized using an iterative process in which netlist 1280 is resynthesized one or more times depending on design specifications and parameters for the device. As with other design structure types described herein, netlist 1280 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 1210 may include hardware and software modules for processing a variety of input data structure types including Netlist 1280. Such data structure types may reside, for example, within library elements 1230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1240, characterization data 1250, verification data 1260, design rules 1270, and test data files 1285 which may include input test patterns, output test results, and other testing information. Design process 1210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1210 without deviating from the scope and spirit of the invention. Design process 1210 may also include modules for performing standard circuit design processes such as parasitic capacitance extraction, verification, design rule checking, place and route operations, etc. Improved parasitic capacitance extraction can be performed as described herein.

Design process 1210 employs and incorporates logic and physical design tools such as HDL compilers and simulation model build tools to process design structure 1220 together with some or all of the depicted supporting data structures along with any additional mechanical design or data (if applicable), to generate a second design structure 1290. Design structure 1290 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 1220, design structure 1290 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 1290 may comprise a compiled, executable HDL simulation model that functionally simulates the devices to be analyzed.

Design structure 1290 may also employ a data format used for the exchange of layout data of integrated circuits and/or symbolic data format (e.g. information stored in a GDSII (GDS2), GL1, OASIS, map files, or any other suitable format for storing such design data structures). Design structure 1290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 1290 may then proceed to a stage 1295 where, for example, design structure 1290: proceeds to tape-out, is released to manufacturing, is released to a mask house, is sent to another design house, is sent back to the customer, etc.

Figure 13:
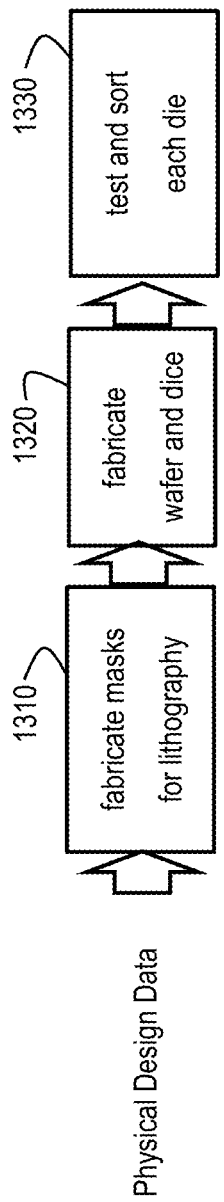
FIG. 13 depicts a flow diagram of a design process used in semiconductor design, manufacture, and/or test.

Once the physical design data is obtained, based, in part, on the design processes described herein, an integrated circuit designed in accordance therewith can be fabricated according to known processes that are generally described with reference to FIG. 13. Generally, a wafer with multiple copies of the final design is fabricated and cut (i.e., diced) such that each die is one copy of the integrated circuit. At block 1310, the processes include fabricating masks for lithography based on the finalized physical layout. At block 1320, fabricating the wafer includes using the masks to perform photolithography and etching. Once the wafer is diced, testing and sorting each die is performed at 1330 to filter out any faulty die.

Exemplary System and Article of Manufacture Details

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying a putative design of an integrated circuit comprising a target wiring layer, a first adjacent wiring layer that is above the target wiring layer, and a second adjacent wiring layer that is below the target wiring layer, wherein each adjacent wiring layer includes crossing wires that run orthogonal to wires of the target wiring layer, the method comprising:
   receiving the putative design of the integrated circuit;
   selecting a target wire disposed in the target wiring layer to perform capacitance extraction;
   identifying lateral neighbors of the target wire in the target wiring layer;
   defining regions of the target wire where the lateral neighbors are homogeneous in cross-section;
   for each region of the target wire, calculating a wire pattern for the crossing wires that has uniform individual wire widths above and below the target wire and has the same spacings between wires as in the first and second adjacent wiring layers;
   within each region of the target wire, identifying segments within above and below portions of the wire pattern, wherein each segment includes a space and half-widths of adjacent wires;
   for each above and below segment pair, obtaining a per-unit-length capacitance from a reduced pattern database;
   extracting a total parasitic capacitance of the combination of wiring patterns by combining the per-unit-length pattern capacitances;
   assessing impact of the total parasitic capacitance on circuit performance; and
   in response to the assessment of impact on circuit performance, producing a modified design by modifying the putative design of the integrated circuit to adjust the spacing between wires in at least one of the target wiring layer, the first adjacent wiring layer, and the second adjacent wiring layer.

2. The method of claim 1 wherein obtaining the per-unit-length capacitance for a segment in the adjacent wiring layer includes searching the reduced pattern database for wiring patterns that include combinations of the segment with segments of the opposite adjacent wiring layer.

3. The method of claim 2 wherein each of the wiring patterns of the reduced pattern database has a first uniform wire width and a first uniform wire spacing in the segments of the adjacent wiring layer and has a second uniform wire width and a second uniform wire spacing in the segments of the opposite adjacent wiring layer, wherein the first and second uniform wire width and wire spacings are the same or different among each of the wiring patterns.

4. The method of claim 3 wherein for each wiring pattern the reduced pattern database includes a corresponding per-unit-length capacitance.

5. The method of claim 2 wherein searching the reduced pattern database includes indexing the wiring patterns of the reduced pattern database by the uniform wire width and by space width for each space in the first and second adjacent wiring layers, and by the target width and the widths and spacings of lateral wires.

6. The method of claim 5 wherein extracting the parasitic capacitance of the combination of wiring patterns includes retrieving from the reduced pattern database the corresponding parasitic capacitance per unit length of each wiring pattern that was indexed.

7. The method of claim 6 wherein extracting the parasitic capacitance of the combination of wiring patterns includes first obtaining a total by summing together the parasitic capacitances per unit length of each wiring pattern multiplied by the lengths of each pair of segments in each wiring pattern, then dividing the total by a total length of the region.

8. The method of claim 1 further comprising fabricating an integrated circuit according to the modified design.

9. An apparatus comprising:
   a memory embodying computer executable instructions; and
   at least one processor, coupled to the memory, and operative by the computer executable instructions to facilitate a method of:
   receiving a putative design of an integrated circuit comprising a target wiring layer, a first adjacent wiring layer that is above the target wiring layer, and a second adjacent wiring layer that is below the target wiring layer, wherein each adjacent wiring layer includes crossing wires that run orthogonal to wires of the target wiring layer;
   selecting a target wire disposed in the target wiring layer to perform capacitance extraction;
   identifying lateral neighbors of the target wire in the target wiring layer;
   defining regions of the target wire where the lateral neighbors are homogeneous in cross-section;
   for each region of the target wire, calculating a wire pattern for the crossing wires that has uniform individual wire widths above and below the target wire and has the same spacings between wires as in the first and second adjacent wiring layers;
   within each region of the target wire, identifying segments within above and below portions of the wire pattern, wherein each segment includes a space and half-widths of adjacent wires;
   for each above and below segment pair, obtaining a per-unit-length capacitance from a reduced pattern database;
   extracting a total parasitic capacitance of the combination of wiring patterns by combining the per-unit-length pattern capacitances;
   assessing impact of the total parasitic capacitance on circuit performance; and
   in response to the assessment of impact on circuit performance, producing a modified design by modifying the putative design of the integrated circuit to adjust the spacing between wires in at least one of the target wiring layer, the first adjacent wiring layer, and the second adjacent wiring layer.

10. The apparatus of claim 9 wherein obtaining the per-unit-length capacitance for a segment includes searching the reduced pattern database for wiring patterns that include combinations of the segment with segments of the opposite adjacent wiring layer.

11. The apparatus of claim 10 wherein each of the wiring patterns of the reduced pattern database has a first uniform wire width and a first uniform wire spacing in the segments of the adjacent wiring layer and has a second uniform wire width and a second uniform wire spacing in the segments of the opposite adjacent wiring layer, wherein the first and second uniform wire width and wire spacings are the same or different among each of the wiring patterns.

12. The apparatus of claim 11 wherein for each wiring pattern the reduced pattern database includes a corresponding per-unit-length capacitance.

13. The apparatus of claim 12 wherein searching the reduced pattern database includes calculating a uniform wire width for each of the first and second adjacent wiring layers, and includes indexing the wiring patterns of the reduced pattern database by the uniform wire width and by space width for each space in the first and second adjacent wiring layers.

14. The apparatus of claim 13 wherein extracting the parasitic capacitance of the combination of wiring patterns includes retrieving from the reduced pattern database the corresponding parasitic capacitance per unit length of each wiring pattern that was indexed.

15. The apparatus of claim 14 wherein extracting the parasitic capacitance of the combination of wiring patterns includes first obtaining a total by summing together the parasitic capacitances per unit length of each wiring pattern multiplied by the lengths of each pair of segments in each wiring pattern, then dividing the total by a total length of the region.

16. A non-transitory computer readable medium embodying computer executable instructions which when executed by a computer cause the computer to facilitate the method of:
receiving a putative design of an integrated circuit comprising a target wiring layer, a first adjacent wiring layer that is above the target wiring layer, and a second adjacent wiring layer that is below the target wiring layer, wherein each adjacent wiring layer includes crossing wires that run orthogonal to wires of the target wiring layer;
selecting a target wire disposed in the target wiring layer to perform capacitance extraction;
identifying lateral neighbors of the target wire in the target wiring layer;
defining regions of the target wire where the lateral neighbors are homogeneous in cross-section;
for each region of the target wire, calculating a wire pattern for the crossing wires that has uniform individual wire widths above and below the target wire and has the same spacings between wires as in the first and second adjacent wiring layers;
within each region of the target wire, identifying segments within above and below portions of the wire pattern, wherein each segment includes a space and half-widths of adjacent wires;
for each above and below segment pair, obtaining a per-unit-length capacitance from a reduced pattern database;
extracting a total parasitic capacitance of the combination of wiring patterns by combining the per-unit-length pattern capacitances;
assessing impact of the total parasitic capacitance on circuit performance; and
in response to the assessment of impact on circuit performance, producing a modified design by modifying the putative design of the integrated circuit to adjust the spacing between wires in at least one of the target wiring layer, the first adjacent wiring layer, and the second adjacent wiring layer.

17. The non-transitory computer readable medium of claim 16 wherein obtaining the per-unit-length capacitance for a segment includes searching the reduced pattern database for wiring patterns that include combinations of the segment with segments of the opposite adjacent wiring layer.

18. The non-transitory computer readable medium of claim 17 wherein each of the wiring patterns of the reduced pattern database has a first uniform wire width and a first uniform wire spacing in the segments of the adjacent wiring layer and has a second uniform wire width and a second uniform wire spacing in the segments of the opposite adjacent wiring layer, wherein the first and second uniform wire width and wire spacings are the same or different among each of the wiring patterns.

19. The non-transitory computer readable medium of claim 18 wherein for each wiring pattern the reduced pattern database includes a corresponding per-unit-length capacitance.

20. The non-transitory computer readable medium of claim 19 wherein searching the reduced pattern database includes calculating a uniform wire width for each of the first and second adjacent wiring layers, and includes indexing the wiring patterns of the reduced pattern database by the uniform wire width and by space width for each space in the first and second adjacent wiring layers.

\* \* \* \* \*